UNITED STATES PATENT OFFICE.

SIGMUND VON KAPFF, OF AACHEN, GERMANY.

CELLULOSE FORMATE.

955,082. Specification of Letters Patent. Patented Apr. 12, 1910.

No Drawing. Application filed July 24, 1909. Serial No. 509,386. (Specimens.)

*To all whom it may concern:*

Be it known that I, SIGMUND VON KAPFF, a subject of the King of Würtemberg, residing at 100 Boxgraben, Aachen, Germany, have invented certain new and useful Improvements Relating to Cellulose Formates; and I do hereby declare the following to be a full, clear, and exact description of the invention.

The subject-matter of my invention is an improved process of making cellulose formate.

It is well-known that cellulose dissolves in formic acid when sulfuric or hydrochloric acid is added to the formic acid. There are difficulties in recovering such a mixture of inorganic acid and formic acid, and the solution of cellulose in this mixture is subjected, owing to the presence of the strong inorganic acid, to relatively rapid decomposition or still more radical change which makes the employment of this solution for making artificial silk either quite impossible or very difficult and attended by great losses. Now I have found that the above mentioned inorganic acids can be replaced by chlorid of zinc, whereby cellulose ester solutions which are stable for a longer time are obtained and a simple recovery of the unconsumed formic acid by distillation is made possible.

The present invention contemplates the subjection of the cellulose (as such or in the form of hydrocellulose or in other suitable condition) to the simultaneous action of zinc chlorid and formic acid. Cellulose formate cannot be produced by the action of formic acid alone, or chlorid of zinc alone, or by the action of first one and then the other. The simultaneous action of these reagents is necessary, even if the cellulose be used in the form of cellulose hydrate. The simultaneous action of the chlorid of zinc and formic acid may be explained by the following equation which illustrates the formation of monoformate of cellulose:

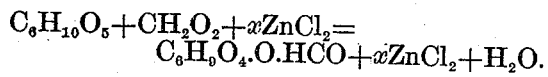

$$C_6H_{10}O_5 + CH_2O_2 + xZnCl_2 = C_6H_9O_4.O.HCO + xZnCl_2 + H_2O.$$

The cellulose formate obtained may be freed from the zinc chlorid by washing with water and may then be dissolved in formic acid, so as to give a solution of cellulose formate which is free from zinc chlorid. It is thus possible to obtain by a very simple process cellulose formate instead of cellulose hydrate. Furthermore the formic acid employed in dissolving the washed cellulose formate may be diluted. Again it may be very important for various reasons that no zinc chlorid be present in the final cellulose formate solution.

The employment of chlorid of zinc in acetylizing cellulose cannot be considered an analogous process inasmuch as acetic anhydrid and not acetic acid is operative in the acetylizing process.

In the following examples the proportions stated are by weight.

Example I: About 15 to 30 parts of zinc chlorid are dissolved in 100 parts of concentrated formic acid. Into this solution cellulose (as such, as well as in the form of cotton or of mercerized cotton or in the form of oxycellulose, hydrocellulose, hydrooxycellulose so that by the term cellulose all such forms of the same are included) is placed which dissolves gradually when cold and quicker when heated, a mixture of various cellulose formates, *i. e.* cellulose monoformates, diformates and triformates, but principally the latter being formed.

By the described mode of operation a cellulose formate solution is obtained, which contains zinc chlorid. If, however, it is desired to obtain a solution of cellulose formate free from zinc chlorid it is advantageous to treat the solution thus obtained with water or to add water thereto, so as to produce a precipitate, which is washed with water and then dissolved in concentrated formic acid. In this case it is practicable to employ a concentrated formic acid for dissolving the precipitate but it is not necessary to employ also concentrated formic acid for treating the cellulose with zinc chlorid. These variations are shown in Example II:

About 50 parts of zinc chlorid are dissolved in about 40 parts of diluted (say 30% to 50%) formic acid. With this solution say 6% (by weight of the solution) of cellulose, as above mentioned, is impregnated which gradually dissolves when cold and quicker when heated. Water is now added so as to produce a cellulosic precipitate, which is well washed with water and then separated from the water and dried if desired. This product is dissolved in concentrated formic acid, cellulose formate being produced in a dissolved state.

From the solutions obtained according to the present invention the cellulose can be separated in known manner as artificial silk and the like and the solvent can be recovered without change and almost without loss.

I claim:

1. The hereindescribed process of making cellulose formate which consists in dissolving cellulose as described in a solution of zinc chlorid in formic acid.

2. The hereindescribed process of making cellulose formate which consists in dissolving cellulose as described with a solution of zinc chlorid in formic acid, precipitating the cellulosic matter therefrom, washing the precipitate with water, eliminating the water therefrom and dissolving the precipitate in formic acid, substantially as and for the purpose set forth.

In testimony whereof I have signed my name to this specification, in the presence of two subscribing witnesses.

SIGMUND VON KAPFF.

Witnesses:
HEINRICH SCHEINS,
HENRY QUADFLIEG.